(12) United States Patent
Van Durme et al.

(10) Patent No.: US 12,314,670 B2
(45) Date of Patent: May 27, 2025

(54) SEMANTIC PARSING OF UTTERANCE USING CONTRACTIVE PARAPHRASING

(71) Applicant: Microsoft Technology Licensing, LLC, Redmond, WA (US)

(72) Inventors: Benjamin David Van Durme, Baltimore, MD (US); Adam D. Pauls, San Francisco, CA (US); Daniel Louis Klein, Orinda, CA (US); Eui Chul Shin, San Francisco, CA (US); Christopher H. Lin, Bellevue, WA (US); Pengyu Chen, Union City, CA (US); Subhro Roy, Walnut Creek, CA (US); Emmanouil Antonios Platanios, Pittsburgh, PA (US); Jason Michael Eisner, Baltimore, MD (US); Benjamin Lev Snyder, Bellevue, WA (US); Samuel McIntire Thomson, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 17/229,637

(22) Filed: Apr. 13, 2021

(65) Prior Publication Data
US 2022/0327288 A1  Oct. 13, 2022

(51) Int. Cl.
*G06F 40/30* (2020.01)
*G06F 40/205* (2020.01)
(Continued)

(52) U.S. Cl.
CPC ............ *G06F 40/30* (2020.01); *G06F 40/205* (2020.01); *G06F 40/55* (2020.01); *G06F 40/58* (2020.01)

(58) Field of Classification Search
None
See application file for complete search history.

(56) References Cited

U.S. PATENT DOCUMENTS 9,830,315 B1 * 11/2017 Xiao ....................... G06F 40/30
11,113,481 B2 * 9/2021 Johnson Premkumar ...................
                                                              G10L 15/22
(Continued)

OTHER PUBLICATIONS

"International Search Report and Written Opinion Issued in PCT Application No. PCT/US22/021242", Mailed Date: Jun. 21, 2022, 14 Pages.
(Continued)

*Primary Examiner* — Daniel C Washburn
*Assistant Examiner* — Paul J. Mueller

(57) ABSTRACT

Systems and methods are provided for automatically generating a program based on a natural language utterance using semantic parsing. The semantic parsing includes translating a natural language utterance into instructions in a logical form for execution. The methods use a pre-trained natural language model and generate a canonical utterance as an intermediate form before generating the logical form. The natural language model may be an auto-regressive natural language model with a transformer to paraphrase a sequence of words or tokens in the natural language utterance. The methods generate a prompt including exemplar input/output pairs as a few-shot learning technique for the natural language model to predict words or tokens. The methods further use constrained decoding to determine a canonical utterance, iteratively selecting sequence of words as predicted by the model against rules for canonical utterances. The methods generate a program based on the canonical utterance for execution in an application.

20 Claims, 9 Drawing Sheets

(51) Int. Cl.
    *G06F 40/55*     (2020.01)
    *G06F 40/58*     (2020.01)

(56) References Cited

U.S. PATENT DOCUMENTS

| | | | |
|---|---|---|---|
| 2017/0011116 A1* | 1/2017 | Liu | G06F 16/35 |
| 2017/0323636 A1* | 11/2017 | Xiao | G06N 3/084 |
| 2018/0061408 A1* | 3/2018 | Andreas | G10L 15/22 |
| 2021/0064828 A1* | 3/2021 | Johnson Premkumar | G10L 15/063 |

OTHER PUBLICATIONS

Xu, et al., "AutoQA: From Databases To QA Semantic Parsers With Only Synthetic Training Data", In Repository of arXiv:2010.04806v1, Oct. 9, 2020, 13 Pages.

* cited by examiner

SEMANTIC PARSING OF UTTERANCE USING CONTRACTIVE PARAPHRASING

BACKGROUND

Traditional systems recognize a natural language utterance for generating a command for execution. In practice, these traditional systems recognize a specific set of pre-defined natural language utterance that is in a particular task domain. In some of these systems, the recognition process relies upon a set of predefined mapping between the natural language utterance and one or more commands. Some other systems use natural language models to predict utterances based on given input. Developing a task-specific natural language processing systems requires generating extensive sets of rules and mapping data for training the natural language model. As areas of applications of computing systems expand, the needs of developing the natural language models for new areas of applications with new tasks arise. Thus, developing a technology that serves the needs and minimizes trade-offs in development costs would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by semantic parsing of a natural language utterance based on a canonical utterance using a pre-trained, large-scale natural language model. The semantic parsing includes translating a natural language sentence (i.e., utterance) into a structured representation (e.g., program instructions for execution). In particular, the semantic parsing in the present disclosure receives the natural language utterance and generates a prompt. The prompt includes a set of the natural language utterance and exemplar conversational sentences that are relevant to the natural language utterance. A pre-trained natural language model predicts an utterance based on the prompt. In aspects, a "canonical utterance" includes a natural language-like sentence based on pre-defined grammatical rules and other rules for mapping to instructions. A constrained decoding generates a canonical utterance based on a sequence of words or tokens (i.e., parts of a word) as predicted by the natural language model. The predefined grammatical rules may enable efficient compilation of the canonical utterance into instructions (i.e., a logical form) for execution and/or for further processing.

The natural language model may be a pre-trained, auto-regressive natural language model using a transformer. The natural language model receives the prompt. In aspects, the natural language model outputs a series of a set of words (and/or parts of a word as tokens) with probability values as predicted words based on billions of words of training data. A constrained decoder iteratively determines a sequence of words based on the output from the natural language model and generates a canonical utterance. The constrained decoder helps accurately generate that canonical utterance that can be compiled into instructions efficiently.

The instructions include one or more commands with parameters as specified by the natural language utterance through the canonical utterance. The automatic generation of the instructions based on the semantic parsing using the natural language model may be used in the area of a digital assistant system and a smart speaker, for example to provide various application services (e.g., a calendar application and a task management application). The process for generating a canonical utterance using contractive paraphrasing of a pre-trained natural language model with billions of trained parameters, followed by generating an instruction based on the canonical utterance will be the primary focus of the present disclosure.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
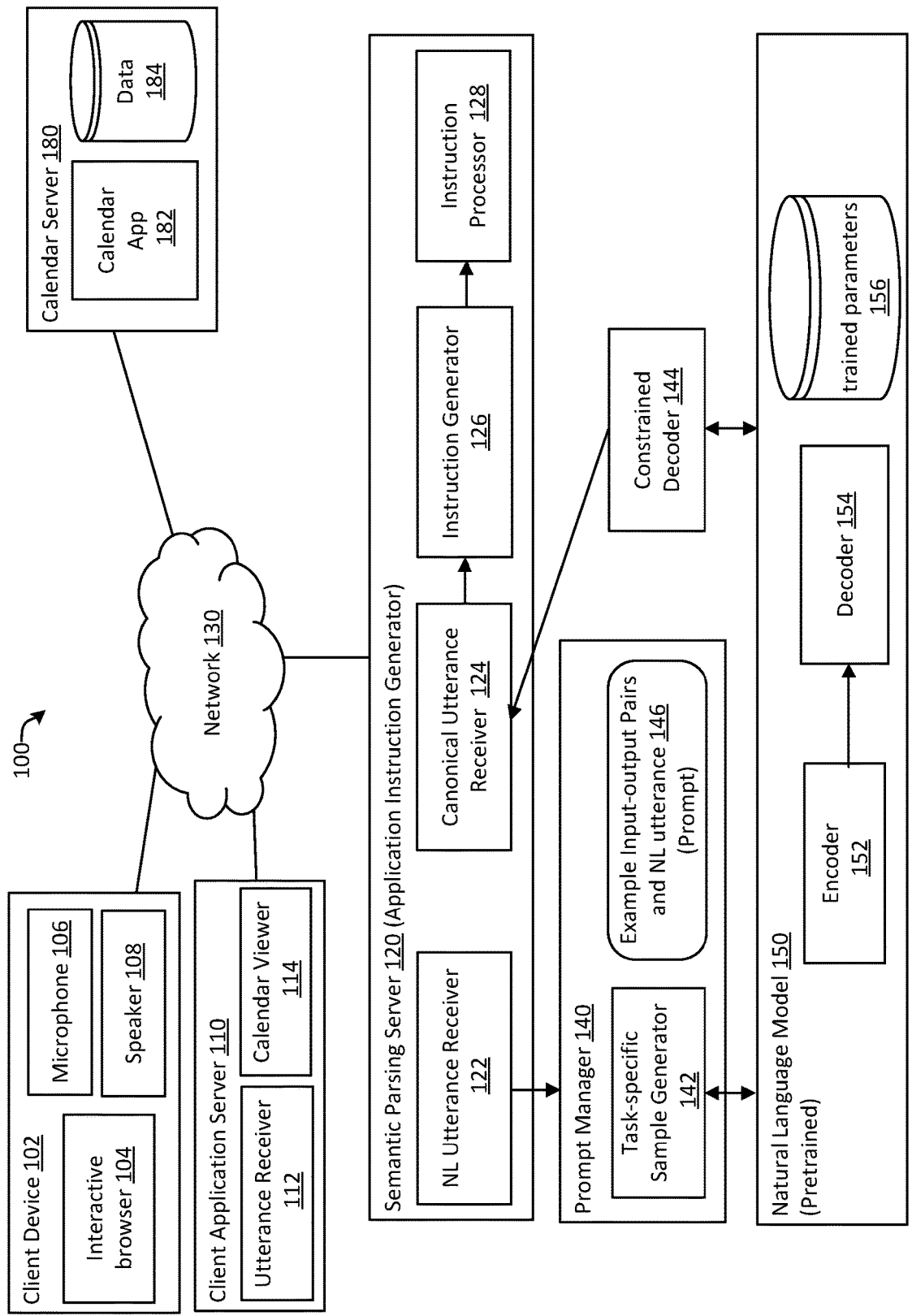
FIG. 1 illustrates an overview of an example system for performing semantic parsing for automatically generating an instruction in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In examples, a semantic parser translates a natural language sentence into a structured representation or a logical form (e.g., a program, instructions, etc.). In further examples, semantic parsers may generate a canonical utterance as an intermediary before generating program instructions through various means, including using a predetermined set of grammatical rules for the canonical utterance. In aspects, the semantic parser may be a machine learnt semantic parser, which uses a trained machine learning model to generate the canonical utterance. The semantic parsers may score candidate canonical utterances based on relevance to the natural language utterance. The scored candidate canonical utterances may filtered to determine the canonical utterance.

Issues arise when developing highly accurate semantic parsers that cover a wider range of tasks and applications. For example, the training process includes adding predefined sets of examples of mappings from natural language utterances into programs. An extensive training includes preparing a large number of examples of mapping data.

As will be discussed in further detail below, the present disclosure relates to systems and methods for automatically generating instructions based on a received natural language utterance using semantic parsing. The semantic parsing utilizes a pre-trained natural language model based on transformers with a high number of parameters (e.g., millions, billions, etc.) and further uses a constrained decoder to generate a canonical utterance with a strict set of grammatical rules that maps efficiently to program instructions. The present disclosure provides for generation of a prompt as input to the pre-trained natural language model. The prompt includes the natural language utterance and one or more exemplary pairs of conversational sentences. The prompt includes examples that are relevant to a natural language query. The pre-trained natural language model predicts a set of recommended utterances by generating a sequence of tokens and probability values associated with the respective tokens in sequence. A constrained decoder determines a canonical utterance by selecting a sequence of words based on the sequence of tokens and probability values. The constrained decoder determines a canonical utterance based on a set of grammatical rules associated with a canonical utterance. In aspects, the set of grammatical rules characterizes translation between the canonical utterance and instructions. Accordingly, the semantic parsing generates one or more instructions based on the canonical utterance for execution. The system executes the generated instructions to perform a command as a task of an application as given by the user.

In aspects, the auto-regressive natural language model uses a transformer model, which includes attention mechanisms using an encoder and a decoder on a sequence of tokens or words. In an example, an auto-regressive, transformer-based natural language model, such as a generative pre-trained transformer, may include a very large number (e.g., millions or billions) of parameters. The model may be pre-trained, for example, using large data sets consisting of webpages. The auto-regressive natural language model receives a sequence of words as input and outputs a sequence of text that paraphrases the input. One of skill in the art will appreciate that as the number of pre-trained parameters increases, the model becomes more capable of automatically synthesizing, paraphrasing, and/or translating natural language utterances in a wider range of domains with a higher degree of accuracy.

FIG. 1 illustrates an overview of an example system 100 for performing semantic parsing for the automatic generation of an instruction. System 100 uses one or more pre-trained natural language models to generate a canonical utterance that can be used to generate an instruction for execution. System 100 includes a client device 102, a client application server 110, a semantic parsing server 120, a network 130, a prompt manager 140, a constrained decoder 144, and a natural language model 150. The examples shown in FIG. 1 are specific to a calendar application. One of skill in the art, however, will appreciate that the aspects disclosed herein are not limited to specific applications, but can be employed with other types of applications.

The client device 102 communicates with client application server 110, which includes one or more sets of instructions to execute as client applications on the client device 102. In the provided example, client application server 110 includes an utterance receiver 112 and a calendar viewer 114. In aspects, the client application server 110 may include additional client applications (e.g., a task viewer and an utterance speaker) not shown in FIG. 1. The one or more sets of instructions in the client application server 110 may provide an interactive user interface through an interactive browser 104 and utterance input and output devices (e.g., a microphone 106 and a speaker 108) on the client device 102. The semantic parsing server 120 includes a natural language (NL) utterance receiver 122, a canonical utterance receiver 124, an instruction generator 126, and an instruction processor 128. The network 130 provides network connectivity among the client device 102, the client application server 110, and the semantic parsing server 120. The prompt manager 140 includes a task-specific sample generator and example input/output pairs and the NL utterance 146. The natural language model 150 includes an encoder 152, a decoder 153, and trained parameters 156. The calendar server 180 stores and serves calendar schedule data to the semantic parsing server 120 and the client application server 110 over the network 130. In aspects, the client device 102 may be a smartphone or a smart speaker that provides a digital assistant service. The digital assistant service may receive a natural language utterance in the form of an interactive voice input and provide a response to the interactive voice input. The response may be provided in various different forms, such as a speech and/or text.

The client device 102 connects with the client application server 110 via the network 130 to execute applications through the interactive browser 104. The client application server 110 interacts with the client device 102 and the semantic parsing server 120 via the network 130 to perform information queries and retrievals, calendar scheduling, task management, and/or interactions with various other applications. The natural language model 150 may include a pre-trained, auto-regressive natural language model to translate or paraphrase a natural language utterance to an expression in a paraphrased form. In some aspects, the natural language model is not limited to auto-regressive natural language model. Other types of language models with translating or paraphrasing features may also be used.

In aspects, the client device 102 provides an environment for interactively developing a semantic parser for particular tasks and applications (e.g., a calendar application, a task application, a scheduler, etc.) through rapid prototyping. The client device 102 interactively specifies a task (e.g., a calendar application) for generating instructions and editing exemplar user-computer utterances (e.g., representative exemplar input/output pairs) that are specific to tasks.

Client device 102 may be a general computer device operable to receive user provided input, e.g., voice input received via microphone 106, and/or execute an interactive browser 104 operable to search for information over the network 130. The interactive browser 104 may render a graphical user interface associated with a web browser, for example. In aspects, the client device 102 may communicate over the network 130 with the client application server 110. The client device 102 includes microphone 106 for receiving sounds including natural language utterances made by the user. The client device 102 may further includes a speaker 108 for providing an auditory response to the natural language utterance, for example, thought responses may be provided in other forms (e.g., text, video, an action) without departing from the scope of this disclosure.

The client application server 110 receives input from the client device 102 (e.g., a command for looking up a calendar event) which interactively operate the system 100. The client application server 110 may comprise applications including the utterance receiver 112 and the calendar viewer 114. The calendar viewer 114 may provide a rendering of one or more calendar schedules for viewing by the user. The calendar viewer 114 may query and receive calendar schedules and appointments by communicating with the semantic parsing server 120, for example. Additionally, or alternatively, the client application server 110 may include applications that relate to other applications (e.g., a task viewer, an e-commerce application, etc.).

In aspects, the utterance receiver 112 may receive an utterance from the client device 102 and transmit the received utterance as a natural language utterance to the natural language (NL) utterance receiver 122 of the semantic parsing server 120. The NL utterance receiver 122 then sends the received natural language utterance to the prompt manager 140. The canonical utterance receiver 124 may receive a canonical utterance from the constrained decoder 144. The instruction generator 126 generates one or more instructions based on the canonical utterance. In aspects, the instruction generator 126 includes a complier that compiles the canonical utterance and outputs one or more instructions. The instruction processor 128 processes or executes the instructions. In aspects, an instruction includes a command and one or more parameters for executing the command. For example, an instruction may access a calendar event in a calendar. The instruction processor 128 may interact with the calendar application 182 in the calendar server 180 to look up the calendar event based on the instruction. The instruction processor 128 provides results from executing the instruction to the calendar viewer 114 in the client application server 110. The calendar viewer 114 may render the calendar event in the client device 102 by displaying the calendar event and/or announcing the calendar event through the speaker 108 of the client device 102.

The prompt manager 140 generates a prompt as input to the natural language model 150 and determines a canonical utterance. In particular, the task-specific sample generator 142 generates the prompt based on the natural language utterance. In aspects, a "prompt" is a set of one or more interactions between a user and a computer (i.e., task-specific input/output pairs). The task-specific sample generator generates the prompt, which includes a set of exemplary conversations between the user and the computer during a task. The set of exemplary conversations include sentences that are relevant to the natural language utterance. Accordingly, the prompt provides the natural language model 150 (pre-trained) a set of examples for influencing predicted utterances to be consistent in context with the exemplary pairs of sentences. In aspects, the task-specific sample generator 142 generates an utterance based on existing instructions. In aspects, generating and providing the prompt as input to the natural language model 150 represent a dynamic "few-shot" learning technique. The natural language model 150 analyzes the prompt with a few examples that precede the natural language utterance before predicting a response to the natural language utterance. Thus, the natural language model 150 effectively "learns" exemplary input/output pairs representing the task before predicting utterances in response to the natural language utterance without performing a training process.

In aspects, the task-specific sample generator 142 requests the natural language model 150 to determine a level of relevance between respective task-specific input/output pairs and the natural language utterance. The task-specific sample generator 142 selects task-specific input/output pairs that are highly relevant (e.g., selecting top five most relevant pairs) to the natural language utterance for generating the example input/output pairs associate with a task and the NL utterance 146 (prompt). A number of input/output pairs in the prompt may depend on a capacity of input allowed by the natural language model 150. Some natural language models may restrict the capacity of input based on a number of tokens. In aspects, a cost of re-training and/or fine-tuning the natural language model 150 with large numbers of trained parameters is prohibitively expensive. Re-training may include a preparation of a large amount of training data to influence prediction when there are already a very high number (e.g., millions or billions) of trained parameters. Having a few examples may accomplish fine-tuning the natural language model 150 to be specific to a given task. Fine-tuning a large natural language model may result in developing a specialized version of the large natural language model for each task.

In aspects, use of the prompt as input to the natural language model 150 improves accuracy of the predicting tokens of the canonical utterance without extensive re-training. Unlike fine-tuning that limits tasks, use of the prompt enables leveraging the large natural language model for performing many different tasks.

Additionally or alternatively, the disclosed technology includes fine-tuning of the natural language model 150 using predetermined examples. In aspects, the natural language model 150 can allow for fine-tuning via examples rather than dynamically selecting for prompt creation." In certain aspects, fine-tuning using known examples may be more accurate than use of the prompt when a number of pre-determined examples used for the fine-tuning is substantially larger than a number of examples received via a prompt.

The natural language model 150 provides paraphrasing and translations of natural language texts and utterance. In one example, the natural language model 150 may be an auto-regressive language model. The auto-regressive language model receives a sequence of words and/or tokens as input and predicts another sequence of words and/or tokens. In aspects, words and/or tokens may be a part of an utterance or a sentence. Additionally, or alternatively, the natural language model 150 translates a natural language utterance in one language into another natural language utterance in another language. In aspects, the natural language model 150 may include billions of trained parameters.

The natural language model 150 may be based on a transformer. The encoder 152 receives the natural language utterance in the packet from the task-specific sample generator 142. The encoder encodes a set of words or tokens in the prompt into multi-dimensional vector representations. The decoder 154 decodes the encoded vectors to predict a sequence of words or tokens and generates predicted utterances. The prediction may be based on a set of probability distributions of each word or token, indicating likelihood of each word as particular words or phrases in utterances.

In aspects, the pre-trained natural language model includes a very high number (e.g., over millions or billions) of trained parameters 156, thereby accommodating a wide range of domains in analyzing the natural language utterance and predicting utterances as output. In examples, the natural language model 150 may be pre-trained on a dataset of millions of web pages on the Internet. Such a large-scale, transformer-based language model provides a range of features across a variety of domains. The features include, but are not limited to, paraphrasing (or synthesizing) natural language text based on a given natural language utterance or translating a given natural language utterance into a text or an utterance in another language, for example.

The constrained decoder 144 requests for and receives a set of predicted tokens in sequence as output from the natural language model 150. In aspects, a token includes at least a part of a word. Then, the constrained decoder 144 iteratively selects one of the set of predicted tokens filtering out those predicted tokens that do not conform to a set of rules associated with canonical utterances. In some aspects, the rules may include grammatical rules for canonical utterances. The rules characterizes constraints and preferences associated with translation between the canonical utterances and instructions. Accordingly, the allowed sequence of words complies with grammatical rules associated with a canonical utterance. In aspects, the constrained decoder 144 analyzes and compares a word-by-word sequence of each predicted utterance against the allowed sequence of words. After determining a canonical utterance, the constrained decoder 144 provides the determined canonical utterance to the canonical utterance receiver 124 in the semantic parsing server 120.

The canonical utterance receiver 124 receives the canonical utterance from the constrained decoder 144. The instruction generator 126 generates instructions based on the canonical utterance. In aspects, generating the instructions include compiling operations of the canonical utterance into instructions based on a mapping between words in the canonical utterance and commands or parameters of the instructions.

The instruction processor 128 executes the generated instructions. For example, the instruction may include finding a calendar event with a particular participant in a calendar database and obtaining a user response to a meeting invite for the calendar event. In aspects, executing the instructions by the instruction processor 128 dispatches commands to the calendar application 182 in the calendar server 180 to locate the calendar event based on the parameters. The calendar application 182 returns a response status of the user for the calendar event to the instruction processor 128.

The semantic parsing server 120 may transmit results from execution of the instructions to the client application server 110, which, in turn, may provide the results to the client device 102. Additionally, or alternatively, the semantic parsing server 120 may provide the result to the calendar viewer 114, which causes updating the calendar displayed on the interactive browser 104 of the client device.

In aspects, constrained decoding limits paraphrased variations in the output without narrowing the wide range of domains supported by the autoregressive, transformer-based natural language model. Developing some of traditional NLP or ASR systems includes training a natural language model to a specific task or domain. The present disclosure, on the other hand, leverages advantages of a pre-trained, auto-regressive, transformer-based natural language model with a constrained decoder. The constrained decoder 144 enables generating a canonical utterance, which complies with strict grammatical rules and the allowed sequence of words.

In aspects, the present disclosure provides canonical paraphrasing (i.e., paraphrasing a received natural utterance to generate a canonical utterance) based on fine-tuning of the transformer-based natural language model. The fine-tuning of the large-scale, transformer-based natural language model may be costly, however. Training of the natural language model may include preparing data with many-to-many mappings of tokens from natural language utterances to predefined sequences of tokens for canonical utterances. In aspects, a fine-tuning may improve accuracy of the canonical paraphrasing to generate canonical utterance in a new domain. Adding a new functionality includes performing a new fine-tuning of the natural language model using a large number of task-specific training data. Because of the training burden, fine-tuning may not necessarily provide a level of efficiency required to perform rapid prototyping to develop a system in a new domain or applications (e.g., a calendar application, an e-commerce application, etc.).

Additionally, or alternatively, the dynamic few-shot learning technique improves the accuracy of generating canonical utterances that satisfy a predefined set of grammatical forms. The dynamic few-shot learning technique uses training data that may include one or more of the following: a task description, a few exemplar utterances, and/or a prompt of the task. Unlike the fine-tuning that involves training a natural language model, the few-shot learning technique provides bootstrapping of the training data to the natural language model. Unlike the fine-tuning process, which may be time and resource consuming, particularly with respect to model having a large number of parameters, the dynamic few-shot learning technique is suitable for a rapid prototyping system.

Additionally or alternatively, the disclosed technology may generate a canonical utterance based on an instruction and paraphrase a canonical utterance into a natural language utterance using a natural language model. Accordingly, the disclosed technology may generate a triplet (a natural language utterance, a canonical utterance, and an instruction). The disclosed technology may use the triplet data for training the natural language model.

As will be appreciated, the various operations, components, devices, applications, features, etc., described with respect to FIG. 1 are not intended to limit the system 100 to being performed by the particular applications and features described. Accordingly, additional configurations may be employed to practice the methods and systems herein and/or features and applications described may be excluded without departing from the methods and systems disclosed herein.

Figure 2:
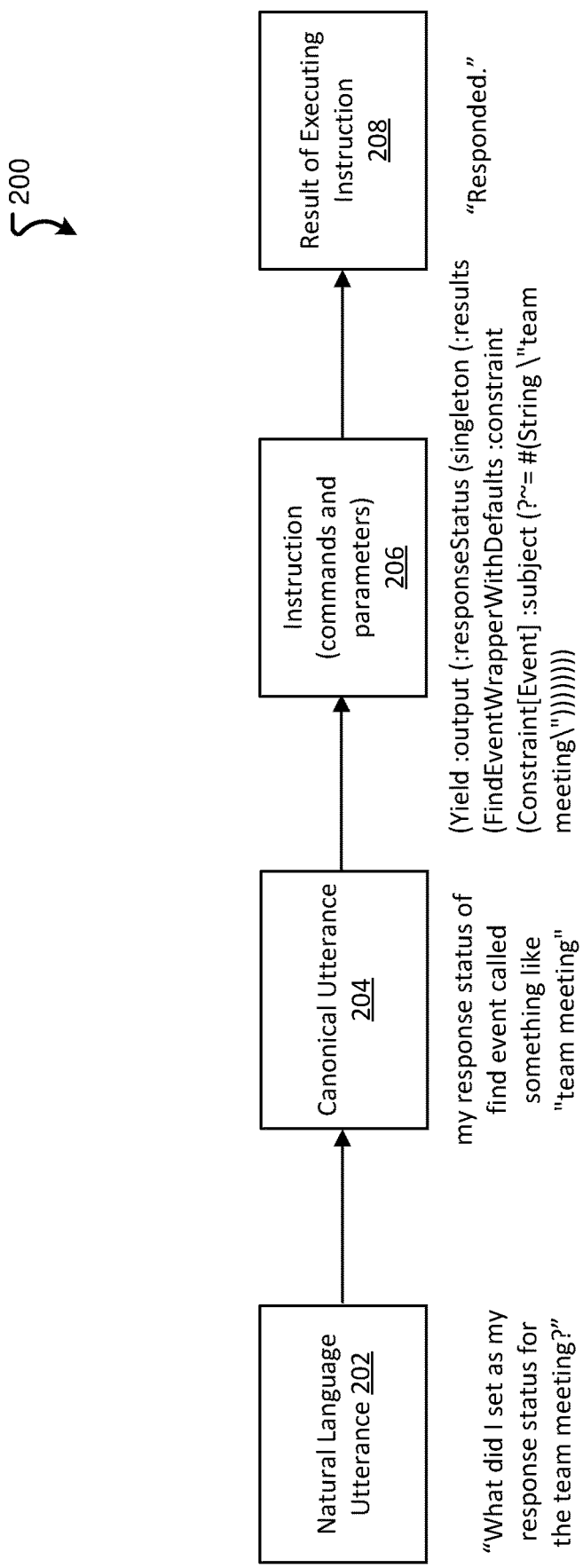
FIG. 2 illustrates an example of processing utterance based on semantic parsing in accordance with aspects of the present disclosure.

FIG. 2 illustrates an example sequence for processing utterance based on semantic parsing in accordance with aspects of the present disclosure. A sequence 200 of data transformation for semantic parsing starts with a natural language utterance 202. The natural language utterance is a user utterance received by the system. For example, the natural language utterance 202 may be a question: "What time am I getting coffee with the team?"

Aspects of the present disclosure generate the canonical utterance 204 by paraphrasing using a constrained decoder. For example, the canonical utterance 204 based on the exemplar natural language utterance may be the following: "What did I set as my response status for the team meeting?" As described above, the canonical utterance 204 is based on a specific set of grammatical rules that is optimized to efficiently and accurately generate a program 206 based on the canonical utterance. In aspects, a required sentence structure for inquiring an event may include "my response status of find event called something like" following by a parameter name (e.g., subject), followed by pairs of parameter name—value. Accordingly, the canonical utterance 204 satisfies the sentence structure rules for being canonical.

The program 206 may include expressions as computer-executable instructions. For example, the instructions may indicate: (Yield: output (: responseStatus (singleton (: results (FindEventWrapperWithDefaults: constraint (Constraint[Event]: subject (?~=#(String\"team meeting\"))))))))). The expression includes one or more commands (e.g., "FindEventWrapperWithDefaults") and parameters with values (e.g., "subject" and "team meeting"). A result of program execution 208 may represent a result of executing the instructions. For example, the result may be "responded." In aspects, executing the instructions causes the system to communicate with the calendar application on the calendar server to search for a calendar event with the given conditions. The calendar application then provides a result in response to the query.

Figure 3:
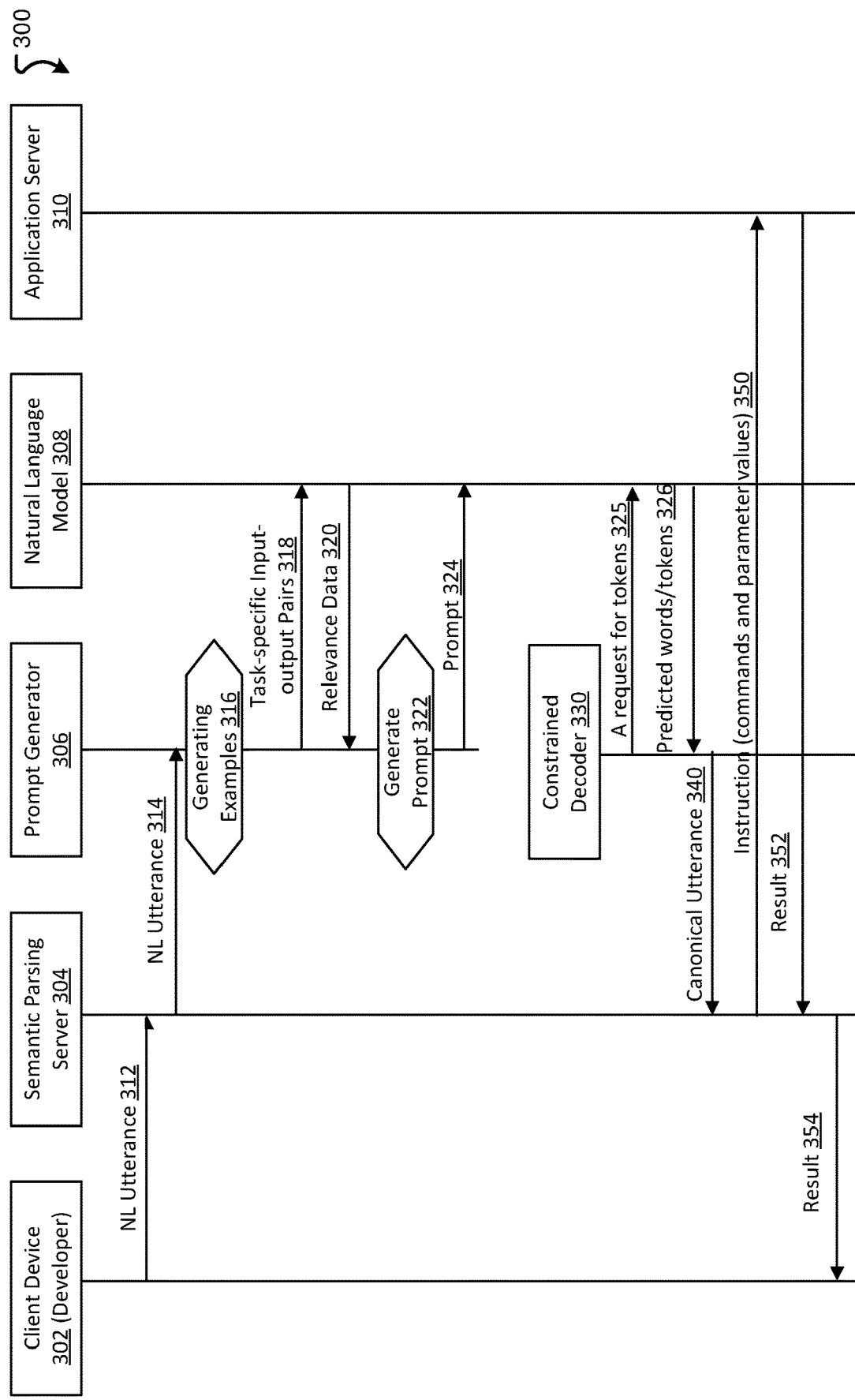
FIG. 3 illustrates an example of processing utterance based on semantic parsing in accordance with aspects of the present disclosure.

FIG. 3 illustrates an example of processing a natural language utterance to generate and execute instructions using semantic parsing in accordance with aspects of the present disclosure. For example, the sequence 300 describes a scenario where a developer operates the system for rapid prototyping a digital assistant application. The client device 302 (used by the developer) transmits 312 a natural language utterance to the semantic parsing server 304. In aspects, the transmission is in response to receiving the natural language utterance from the developer as a test utterance. The semantic parsing server 304 transmits the received natural language utterance 314 to the prompt generator 306.

In aspects, the prompt generator 306 generates a prompt as input to the natural language model. In aspects, a "prompt" includes the received natural language utterance along with input/output utterance pairs. The pairs include representative sets of examples mapping utterances to a corresponding desired output. The prompt includes the natural language utterance as the last user input. A response to the last input (i.e., the natural language utterance) is for a predicted utterance, which is based on output from the natural language model. It is thus currently empty. The prompt generator 306 may generate 316 the exemplary pairs based on previously processed input/output pairs that are relevant to the current task of the natural language utterance.

The prompt generator 306 transmits the example input/output pairs of utterance and computer output to the natural language model 308 to determine 318 a degree of relevance between respective pairs (or, in some aspects, the respective exemplary inputs) and the received natural language utterance. The natural language model 308 may be pre-trained. The natural language model 308 may respond to the request by transmitting 320 relevance information. In aspects, the relevance information include the exemplar input/output pair sorted in the sequence of relevance of the respective pairs to the natural language utterance. The prompt generator 306 then generates the prompt by selecting the top five most relevant exemplar input/output pairs and appending the natural language utterance after the pairs. The number of the pairs in the prompt may be any number of pairs and not limited to exemplary five discussed herein. In aspects, a maximum number of tokens allowed as input to the natural language model 308 may limit the number.

The prompt generator transmits 324 the prompt to the natural language model 308. By predicting utterances base on the received prompt, the natural language model 308 effectively performs a "few-shot" learning technique to predict utterances. The technique guides the natural language model to predict utterances based on the example pairs associated with the task without actually training the natural language model with training data. The natural language model 308 provides to the constrained decoder 330 choices of predicted tokens with probability values for the respective tokens as output.

Additionally or alternatively, the disclosed technology includes fine-tuning of the natural language model based on predetermined examples. In aspects, the fine-tuning of the natural language model may eliminate needs for dynamically generating examples for the prompt. In some other aspects, the fine-tuning may be used in conjunction with use of the prompt to further improve accuracy in the predictions.

The constrained decoder 330 includes determining an utterance that satisfies a constraint or preference on allowed sequences of words in a canonical utterance. The constrained decoder 330 sends a request 325 for predicted words and/or tokens and receives predicted words/tokens 326 from the natural language model 308. In aspects, the constrained decoder 330 drops one or more predicted words and/or tokens, which do not satisfy the constraint or preferences. The resulting sequence of predicted words and/or tokens is a canonical utterance.

The constrained decoder 330 provides the canonical utterance to the semantic parsing server 304. The semantic parsing server 304 generates instructions based on the canonical utterance by compiling operations. In aspects, the compiling operations includes extracting words of the canonical utterance and analyzing grammatical rules associated with the canonical utterance and a syntax of the instructions, mapping the words to commands and/or parameter values of instructions, and generating the instructions based on the syntax of the instructions.

The semantic parsing server 304 executes the instructions. In aspects, executing the instructions causes the semantic parsing server 304 to transmit 350 commands and parameters to the application server 310 to perform an operation, such as performing a query. For example, the instructions may cause the semantic parsing server 304 to query the application server 310 (e.g., a calendar server) for calendar events that match given conditions, a name of participants, etc.

The application server 310 receives the instructions and processes the query. The application server 310 then returns a result 352 to the semantic parsing server 304. For example, the application server may return a date of the calendar event found. The semantic parsing server 304 provides the result 354 to the client device 302 to inform the developer the result. In aspects, the developer may check the result against expected outcome and perform further proceed with the rapid prototyping of the system.

Figure 4:
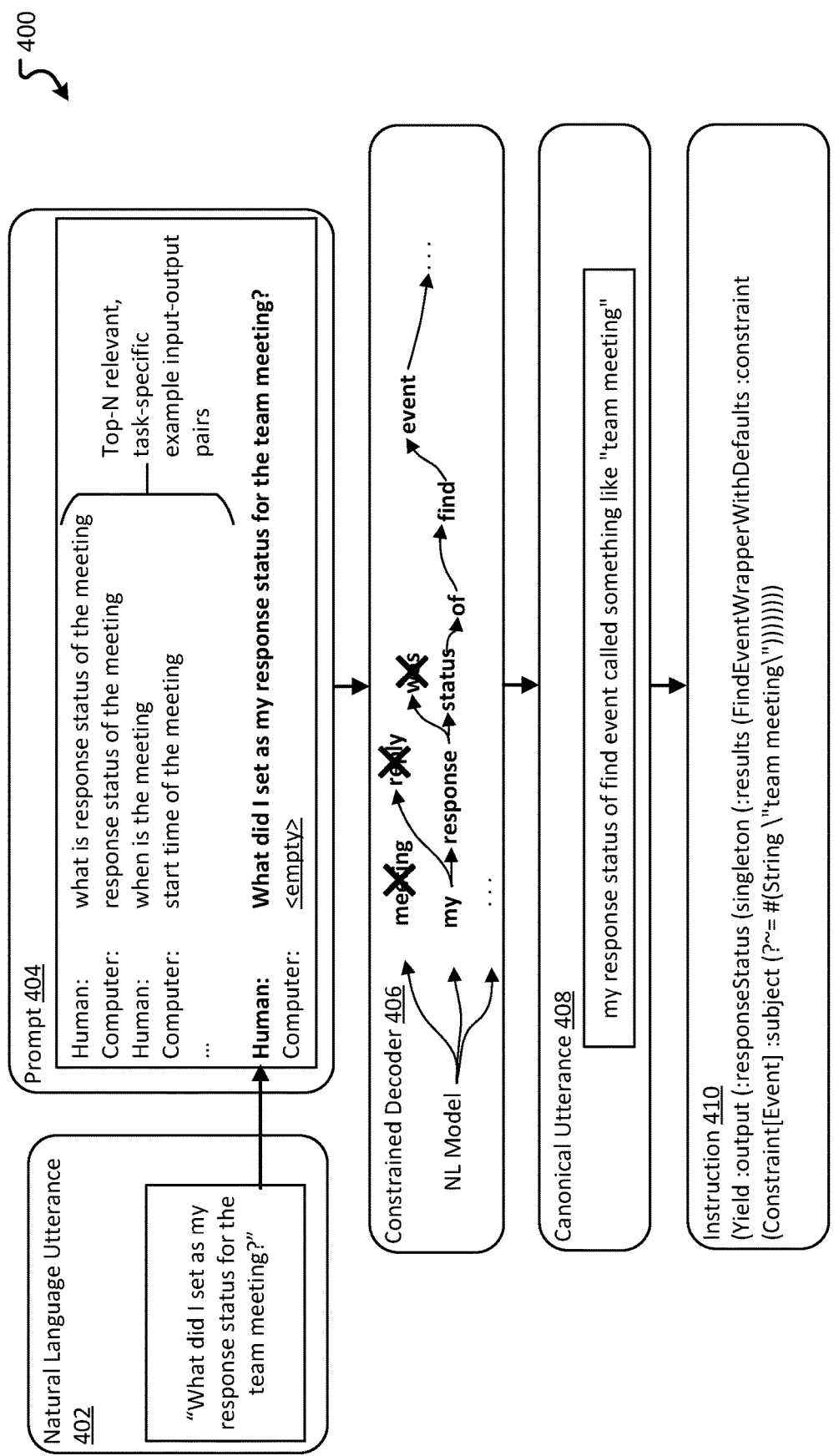
FIG. 4 illustrates an example of processing utterance based on semantic parsing in accordance with aspects of the present disclosure.

FIG. 4 illustrates an example of data used for processing a natural language utterance based on semantic parsing in accordance with aspects of the present disclosure. The data structures 400 include four distinct types of data during various stages of processing the natural language utterance and other data. The natural language utterance 402 is the exemplary utterance "What did I set as my response status for the team meeting?" Based upon the received natural language utterance, the prompt generator generates the prompt 404 as input to the natural language model. For example, the prompt 404 includes two exemplary pairs of input/output (i.e., a user utterance and computer output) pairs that represent a task, followed by the natural language utterance as the last input (as shown in bold text). Each pair includes an utterance by a user and another utterance by the computer. For example, the first pair indicates: "User: what is response statue of the meeting; computer: response status of the meeting." The second pair indicates: "User: when is the meeting; computer: start time of the meeting." In example, the two pairs are a part of the top-N relevant, task-specific example input/output pairs. A number of the most relevant pairs for inclusion in the prompt may be predetermined. A maximum number of tokens allowed as input to the natural language model may limit the number. The goal is to obtain a predicted utterance (i.e., a canonical utterance) as a computer output, in response to the natural language utterance in the prompt.

Constrained decoder 406 decodes each of predicted tokens as outputs of the natural language model to determine a canonical utterance. The constrained decoder 406 uses a data structure to filter out predicted tokens that do not satisfy requirements of specific sequence of words in the canonical utterance. For example, the first word must not be "meeting." The second word after "my" as the first word must not be "reply." The example shows that a predicted utterance includes a sequence of words response-status-of-find-event satisfies sets of rules that characterizes constraints and preferences associated with translation between canonical utterances and instructions. Accordingly, the canonical utterance 408 shows the identified canonical utterance: "response status of find event something like "team meeting."

Instruction 410 includes a set of instructions generated based on the canonical utterance. For example, the instruction indicates: (Yield :output (:responseStatus (singleton (:results (FindEventWrapperWithDefaults :constraint (Constraint[Event]:subject (?~=#(String\"team meeting\"))))))))). The instruction 410 reflects commands and parameters as originally requested by the natural language utterance.

Figure 5:
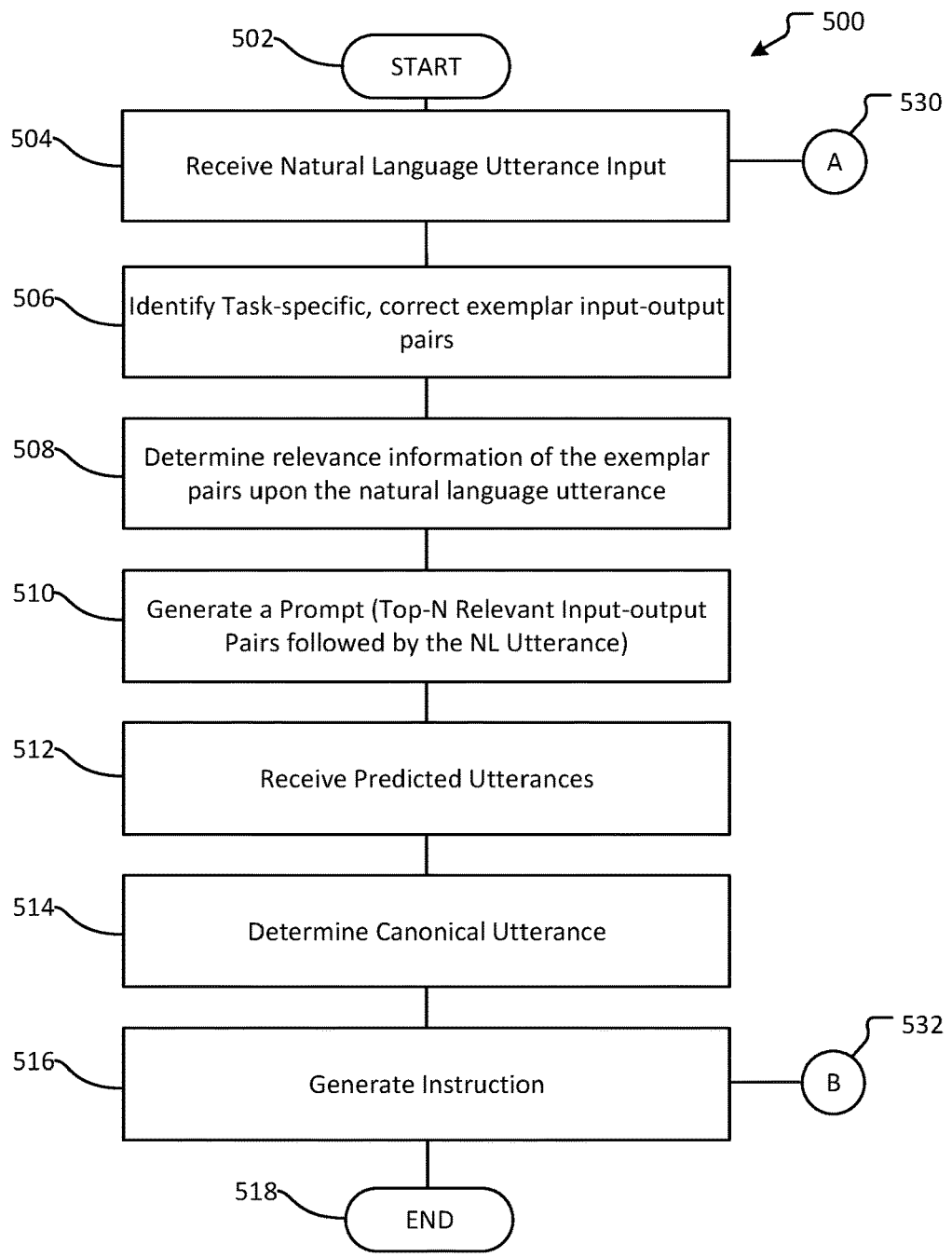
FIG. 5 illustrates an example of a method for semantic parsing in accordance with aspects of the present disclosure

FIG. 5 is an example of a method 500 for generating a program based on a natural language utterance using semantic parsing to generate a canonical utterance in accordance with aspects of the present disclosure. A general order of the operations for the method 500 is shown in FIG. 5. Generally, the method 500 begins with start operation 502 and ends with end operation 518. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4, 6, 7, and 8A-B.

Following start operation 502, the method 500 begins with receive operation 504, which receives a natural language utterance as an input. A user may input the natural language utterance to command a system (e.g., a digital assistant, a smart speaker, etc.) to perform one or more commands. Identify operation 506 identifies task-specific, exemplar input/output pairs. The input/output pair includes a user utterance and a computer utterance associated with the user utterance. In aspects, the identify operation 506 may generate the input/output pairs based on existing sets of instructions. In aspects, the identify operation 506 may include generating an output utterance of the input/output pair based on a previously generated instruction.

Determine operation 508 determines relevance information of the exemplary input/output pairs with respect to the natural language utterance. In aspects, system may use the natural language model to generate relevance information based on respective the exemplar input/output pairs and the natural language utterance.

Generate operation 510 generates a prompt. In aspects, the prompt includes top "N" relevant exemplar input/output pairs, followed by the natural language utterance. The number of the top "N" may be predetermined as a number, the top-3, for example. Additionally, or alternatively, the number may be any number other than three. In aspects, the use of the prompt instead of a single natural language utterance as input represents use of the "few-shot" learning technique to influence prediction without training the natural language model. In aspects, the natural language model may be difficult to train and tune with a small amount of data when the natural language model includes over billions of trained parameters.

Receive operation 512 receives predicted words and/or tokens as an output from the natural language model. In aspects, the output includes, sets of tokens with probability values associated with each token. The output from the natural language model is a response to receiving the prompt as an input.

Determine operation 514 determines a canonical utterance based on the predicted utterance based on the constrained decoding. In aspects, the constrained decoding includes iteratively choosing among predicted tokens based upon constraints and/or preferences associated with translatability of the canonical utterance and instructions. The rules may include grammatical rules associated with the canonical utterance and syntactic rules for translating the canonical utterance into an instruction. The resulting utterance is a canonical utterance.

Generate operation 516 generates instructions based on the canonical utterance. In aspects, the generate operation 516 includes compiling the canonical utterance and generating the instructions. In aspects, method 500 may end with end operation 518. The receive operation marked as A 530 corresponds to the receive operation 604 as marked as A 630 in FIG. 6.

As should be appreciated, operations 502-518 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
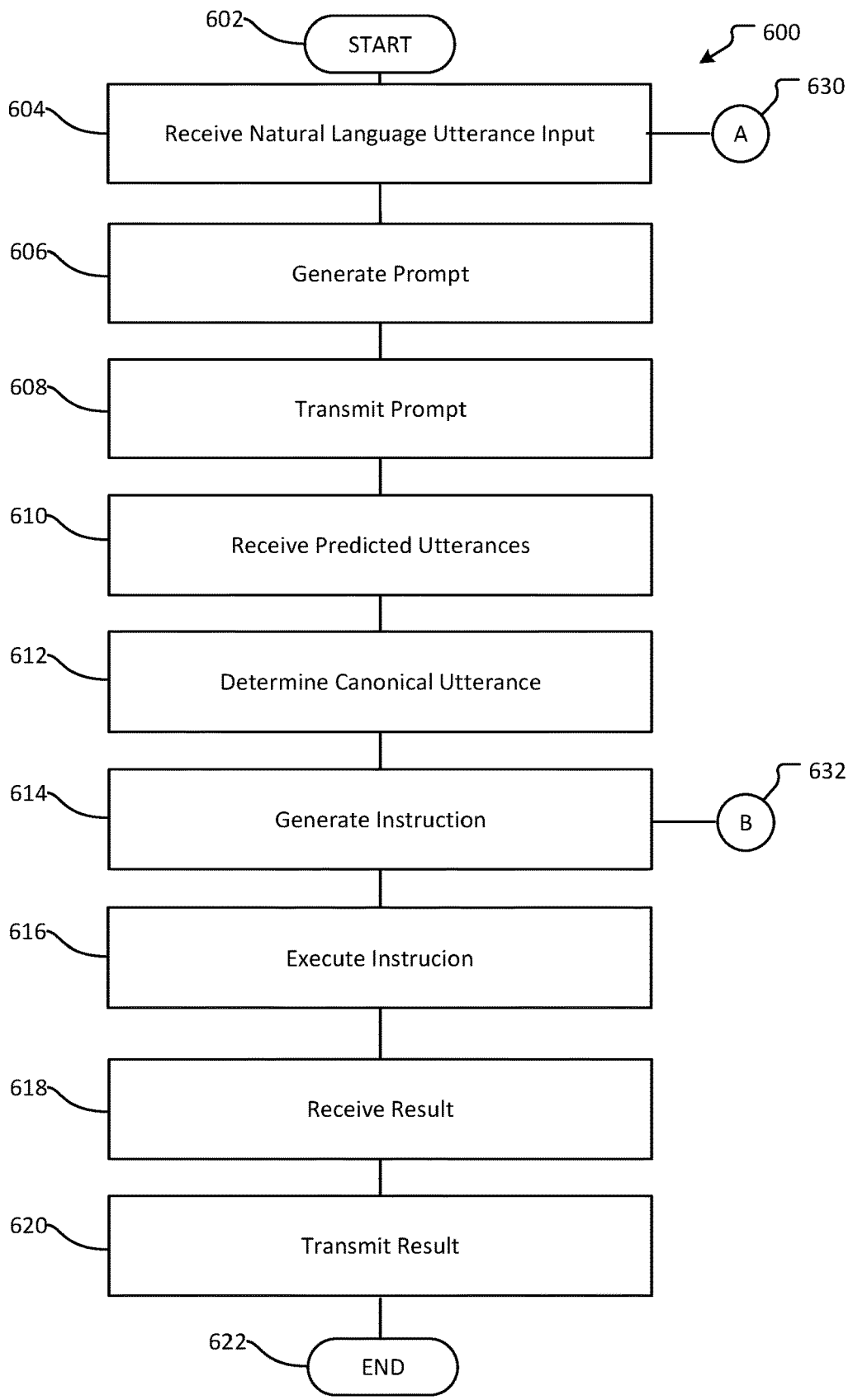
FIG. 6 illustrates an example of a method for generating an instruction and performing the instruction based on semantic parsing in accordance with aspects of the present disclosure.

FIG. 6 is an example of a method 600 for generating a program based on a natural language utterance using semantic parsing to generate a canonical utterance in accordance with aspects of the present disclosure. A general sequence of the operations for the method 600 is shown in FIG. 6. Generally, the method 600 begins with start operation 602 and ends with end operation 622. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4, 5, 7, and 8A-B.

Following start operation 602, the method 600 begins with receive operation 604, which receives a natural language utterance as an input. A user may input the natural language utterance to command a system (e.g., a digital assistant, a smart speaker, etc.) to perform one or more commands.

Receive operation 604 receives a natural language utterance as input. In aspects, a digital assistant may receive voice input as a natural language utterance. The digital assistant may be an application on a smartphone, a smart speaker, and/or on a digital appliance with a microphone for audio input. The receive operation 604, as labeled as A 630 corresponds to the receive operation 504 as labeled as A 530 in FIG. 5.

Generate operation 606 generates a prompt based on the received natural language utterance and a set of correct exemplar input/output pairs of utterances. The input/output pairs are specific to a task associated with the natural language utterance. In aspects the generate operation 606 generates the correct exemplar input/output pairs based on existing sets of instructions that are relevant to the task as indicated by the natural language utterance. Additionally, or alternatively, the generate operation 606 may use the natural language model to determine relevance information of each of the correct exemplar input/output pairs with respect to the natural language utterance. The generate operation 606 select the top-N (e.g., N being any number) most relevant pairs to include inside the prompt. The natural language utterance follows the pairs in the prompt.

Transmit operation 608 transmits the prompt to the natural language model as an input. The natural language model predicts utterances based on the pairs and the natural language utterance. In aspects, the natural language model may be a pre-trained, autoregressive natural language model based on transformers. The natural language model may include billions of trained parameters to predict utterances in response to the natural language utterance.

Receive operation 610 receives from the natural language model predicted utterances. There may be more than utterances as predicted output. Determine operation 612 determines a canonical utterance by performing constrained decoding on each of the predicted utterance. In aspects, the constrained decoding includes extracting and determining whether respective predicted utterances includes words in a specific sequence. The determine operation 612 determines a canonical utterance when a predicted utterance satisfies all the required sequence of words.

Generate operation 614 generates instructions based on the canonical utterance. IN aspects, the generate operation 614 includes compiling the canonical utterance into instructions with specific syntax. The compiling includes analyzing a sentence structure of the canonical utterance, extracting each word for mapping against syntax information of the instructions to determine values for respective commands and parameters, and generate the instructions. In aspects, the process of generating the instruction is efficient because the grammatical rules for the canonical utterance are associated with syntactic rules for the instruction. The generate operation 614 as labeled as B 632 corresponds to the generate operation 516 as labeled B 532.

Execute operation 616 executes the instructions. In aspects, executing the instructions may cause transmitting commands and parameter values to one or more application servers for processing. For example, a calendar application may receive a query based on the command and the parameters to search for a calendar event based on conditions as specified by the parameters values.

The receive operation 618 receives a result of executing the instructions. For example, the receive operation 618 may receive a result of querying a start time of a calendar event: "responded."

Transmit operation 620 transmits the result of executing the instructions to the client device over the network. In aspects, the developer may use the result to further rapid prototype the digital assistant by adjusting tunable parameters of the system, including grammatical rules for constrained decoding and generating the correct exemplar input/output pairs for generating a prompt. In aspects, method 600 may end with end operation 522.

As should be appreciated, operations 602-622 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
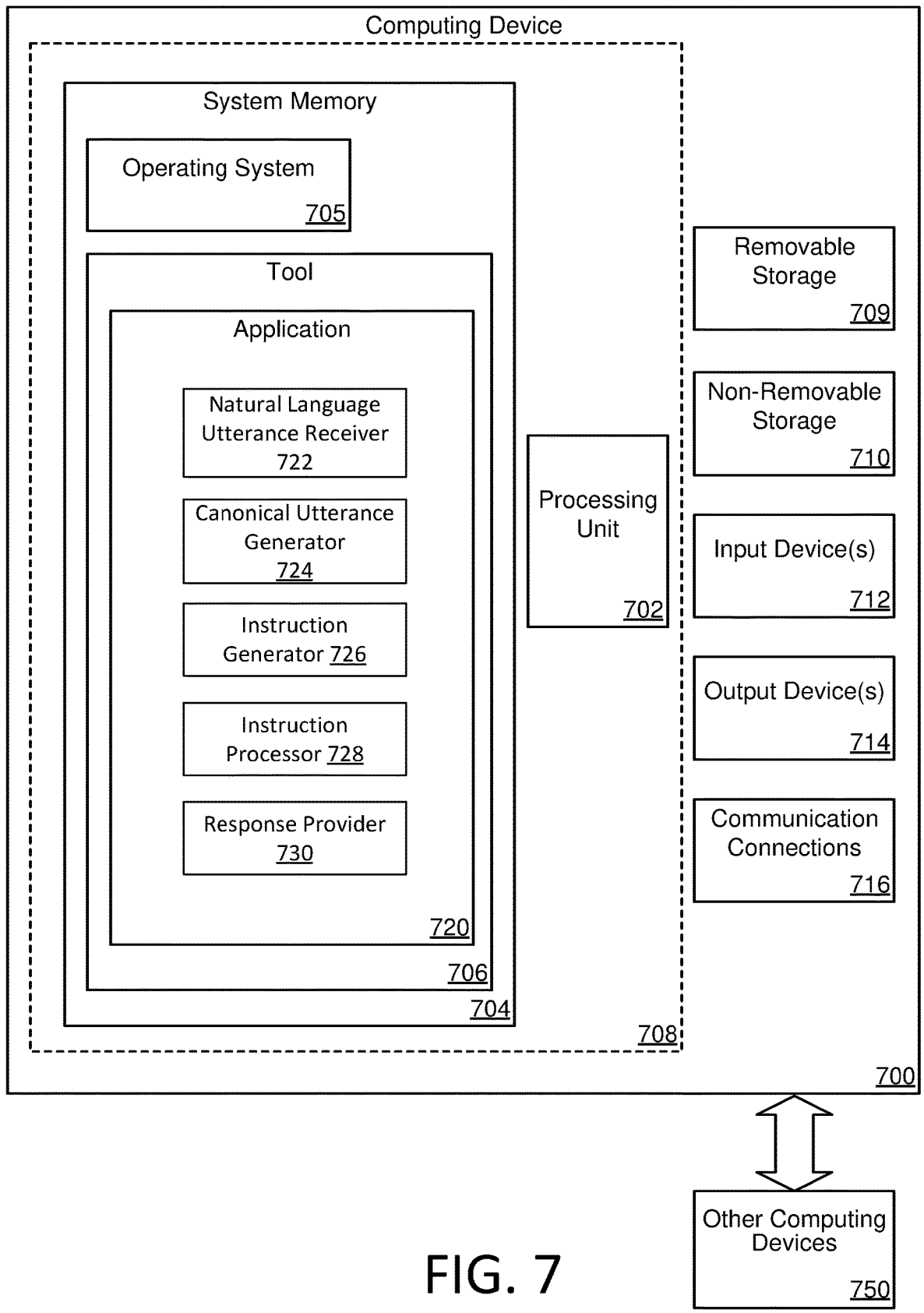
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a natural language utterance receiver 722, canonical utterance generator 724, instruction generator 726, instruction processor 728, and response provider 730, as described in more detail with regard to FIG. 1. The canonical utterance generator 724 generates a prompt and using an auto-regressive natural language model and constrained decoding, instruction generator 726. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
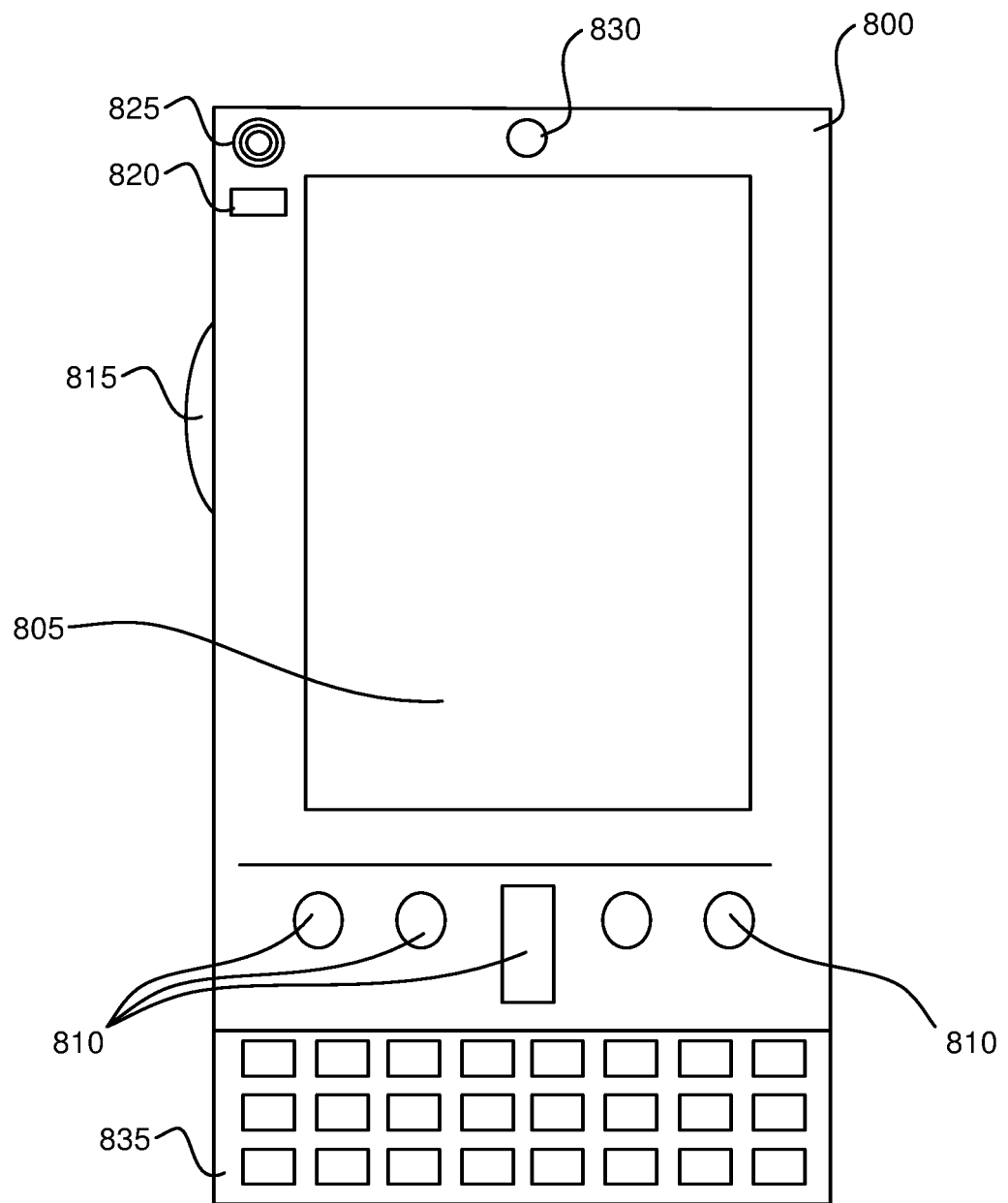
FIG. 8A is a simplified diagram of a mobile computing device with which aspects of the present disclosure may be practiced.
Figure 8B:
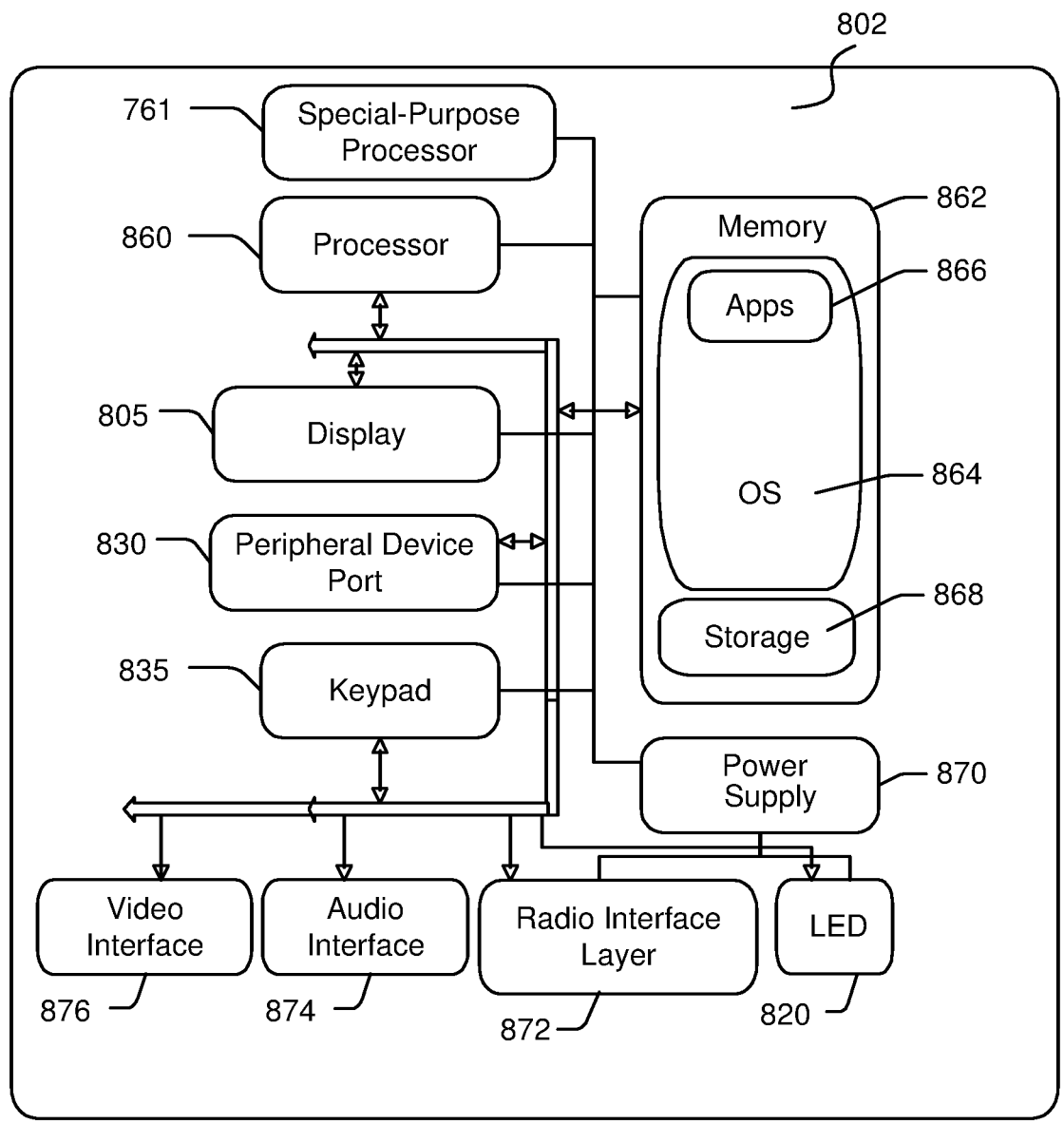
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device 102 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., a client application server 110, a semantic parsing server 120, a natural language model 150, and a calendar server 180 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods of automatically generating an instruction based on a natural language utterance using a pre-trained natural language model according to at least the examples provided in the sections below. The method comprises receiving the natural language utterance; generating, based at least on a combination of the received natural language utterance and one or more exemplary pairs of utterances, a canonical utterance using the pre-trained natural language model, wherein the canonical utterance includes, at least in part, a sequence of words based at least on predicted words using the pre-trained natural language model; generating, based on the generated canonical utterance, an instruction; executing the instruction; generating, based on a result of the executing the instruction, a response; and transmitting the response. The pre-trained natural language model includes an auto-regressive natural language model based on a transformer for paraphrasing a first sequence of tokens as a second sequence of tokens, and wherein the first sequence of tokens and the second sequence of tokens are distinct. The canonical utterance is based on one or more of: a set of grammatical rules associated with constraints and preferences for translating between the canonical utterance and the instruction. The method further includes selecting the one or more exemplary pairs of utterances, wherein each exemplary pair of utterances includes an input utterance and an output utterance, and wherein the output utterance is based at least on one of previously generated instructions; dynamically generating, based on the received natural language utterance, a prompt, wherein the prompt includes the one or more exemplary pairs of utterances followed by the received natural language utterance; transmitting the prompt; receiving at least a plurality of a predicted part of a word as output from the pre-trained natural language model; and generating, based on a series of the plurality of a predicted part of a word, the canonical utterance. The pre-trained natural language model includes at least a million trained parameters. Executing the instruction causes transmitting a command to an application server. The canonical utterance is an intermediate expression of automatically translating the natural language utterance into the instruction. The method further includes generating, based on a previously generated instruction, an output utterance; generating, based at least on the output utterance, an input utterance, wherein a combination of the input utterance and the output utterance forms the one or more exemplary pairs of utterances; generating a prompt based on the one or more exemplary pairs of utterances and the natural language utterance; receiving a series of predicted parts of words from the pre-trained natural language model, wherein the predicted parts of the words are associated with the prompt; and generating, based at least on the series of predicted parts of words, the canonical utterance. The method further includes receiving, from the pre-trained natural language model, at least a part of a predicted utterance; iteratively matching a sequence predicted parts of words based on one or more grammatical rules, wherein the one or more grammatical rules correspond to constraints and preferences for translating between the canonical utterance and the instruction; and determining, based on the iteratively matched sequence of predicted parts of words, the canonical utterance.

Another aspect of the technology relates to a system for automatically generating a program based on a natural language utterance using a pre-trained language model. The system comprises a processor; and a memory storing computer-executable instructions that when executed by the processor cause the system to: receive the natural language utterance; generate, based at least on a combination of the received natural language utterance and one or more exemplary pairs of utterances, a canonical utterance using the pre-trained natural language model, wherein the canonical utterance includes, at least in part, a sequence of words as predicted using the natural language model; generate, based on the generated canonical utterance, an instruction; execute the instruction; generate, based on a result of the executed instruction, a response; and transmit the response. The pre-trained natural language model includes an auto-regressive natural language model based on a transformer for paraphrasing a first sequence of tokens to generate a second sequence of tokens, and wherein the first sequence of tokens and the second sequence of tokens are distinct. The computer-executable instruction when executed further causing the system to: selecting the one or more exemplary pairs of utterances, wherein each pair of exemplar utterances includes an input utterance and an output utterance, and wherein the output utterance is based at least on one of previously generated instructions; dynamically generate, based on the received natural language utterance, a prompt, wherein the prompt includes the one or more exemplary pairs of utterances followed by the received natural language utterance; transmit the prompt; receive at least a plurality of a predicted part of a word as output from the pre-trained natural language model; and generate, based on a series of the predicted part of a word, the canonical utterance. The computer-executable instruction when executed further causing the system to: generate, based on a previously generated instruction, an output utterance; generate, based at least on the output utterance, an input utterance, wherein a combination of the input utterance and the output utterance forms the one or more exemplary pairs of utterances; generate a prompt based on the one or more exemplary pairs of utterances and the natural language utterance; receive a predicted utterance from the pre-trained natural language model, wherein the predicted utterance is associated with the prompt; and generate, based a series of predicted words from the pre-trained natural language model, the canonical utterance. The computer-executable instruction when executed further causing the system to: receive, from the pre-trained natural language model, at least a part of a predicted utterance; iteratively match a sequence predicted parts of words based on one or more grammatical rules, wherein the one or more grammatical rules correspond to constraints and preferences for translating between the canonical utterance and the instruction; and determine, based on the iteratively matched sequence of predicted parts of words, the canonical utterance.

In still further aspects, the technology relates to a computer-readable recording medium storing computer-executable instructions for automatically generating a program based on a natural language utterance using a pre-trained language model. The computer-executable instructions, when executed by a processor, cause a computer system to: receive the natural language utterance; generate, based at least on a combination of the received natural language utterance and one or more exemplary pairs of utterances, a canonical utterance using the pre-trained natural language model, wherein the canonical utterance includes, at least in part, a sequence of words as predicted using the natural language model; generate, based on the generated canonical utterance, an instruction; execute the instruction; generate, based on a result of the executed instruction, a response; and transmit the response. The pre-trained natural language model includes an auto-regressive natural language model based on a transformer for paraphrasing a first sequence of tokens to generate a second sequence of tokens, and wherein the first sequence and the second sequence are distinct. The canonical utterance is based on one or more of a set of grammatical rules associated with constraints and preferences for translating between the canonical utterance and the instruction. The computer-executable instruction when executed further causing the system to: select the one or more exemplary pairs of utterances, wherein each pair of exemplar utterances includes an input utterance and an output utterance, and wherein the output utterance is based at least on one of previously generated instructions; dynamically generate, based on the received natural language utterance, a prompt, wherein the prompt includes the one or more exemplary pairs of utterances followed by the received natural language utterance; transmit the prompt; receive at least a plurality of a predicted part of a word as output from the pre-trained natural language model; and generate, based on a series of the plurality of a predicted part of words from the pre-trained natural language model, the canonical utterance. The computer-executable instruction when executed further causing the system to: generate, based on a previously generated instruction, an output utterance; generate, based at least on the output utterance, an input utterance, wherein a combination of the input utterance and the output utterance forms the one or more exemplary pairs of utterances; generate a prompt based on the one or more exemplary pairs of utterances and the natural language utterance; receive a series of predicted parts of words from the pre-trained natural language model, wherein the predicted parts of the words are is associated with the prompt; and generate, based at least on the series of predicted parts of words, the canonical utterance.

The computer-executable instruction when executed further causing the system to: receive, from the pre-trained natural language model, at least a part of a predicted utterance; iteratively match a sequence of predicted parts of words based on one or more grammatical rules, wherein the one or more grammatical rules correspond to constraints and preferences for translating between the canonical utterance and the instruction; and determine, based on the iteratively matched sequence of predicted parts of words, the canonical utterance.

Any of the one or more above aspects in combination with any other of the one or more aspect. Any of the one or more aspects as described herein.

What is claimed is:

1. A computer-implemented method of automatically generating an instruction code based on a natural language utterance using a pre-trained natural language model, the method comprising:
   receiving the natural language utterance;
   identifying, based on relevance between the received natural language utterance and a pair of a query utterance and an answer utterance, the pair of the query utterance and the answer utterance, wherein the query utterance is distinct from the received natural language utterance;
   generating, based at least on a combination of the received natural language utterance and the identified pair of the query utterance and the answer utterance as input to the pre-trained natural language model, a canonical utterance using the pre-trained natural language model, wherein the pre-trained natural language model performs prediction of words based on the received natural language utterance, the identified pair of the query utterance and the answer utterance represents an example of a natural language utterance input and output to influence predicting the words by the pre-trained natural language model without further training the pre-trained natural language model, the output is in canonical form and is previously generated at least in part by the pre-trained natural language model in response to the query utterance, and the canonical utterance includes, at least in part, a sequence of words based at least on the words predicted by the pre-trained natural language model and a constraint associated with the sequence of words;
   generating, based on the generated canonical utterance, the instruction code, wherein the instruction code is executable by a processor;
   executing, by the processor, the instruction code;
   generating, based on a result of the executing the instruction code, a response; and
   transmitting the response.

2. The method of claim 1, wherein the pre-trained natural language model includes an auto-regressive natural language model based on a transformer for paraphrasing a first sequence of tokens as a second sequence of tokens, and wherein the first sequence of tokens and the second sequence of tokens are distinct.

3. The method of claim 1, wherein the canonical utterance is based on one or more of:
   a set of grammatical rules associated with constraints and preferences for translating between the canonical utterance and the instruction code.

4. The method of claim 1, the method further comprising:
   selecting the pair of the query utterance and the answer utterance, wherein the pair of the query utterance and the answer utterance includes an input utterance to the pre-trained natural language model and an output utterance from the pre-trained natural language model, and wherein the output utterance is based at least on one of previously generated instructions by the pre-trained natural language model;
   dynamically generating, based on the received natural language utterance, a prompt, wherein the prompt includes the pair of the query utterance and the answer utterance followed by the received natural language utterance;
   transmitting the prompt;
   receiving at least a plurality of a predicted part of a word as output from the pre-trained natural language model; and
   generating, based on a series of the plurality of a predicted part of a word, the canonical utterance.

5. The method of claim 1, wherein the pre-trained natural language model includes at least a million trained parameters.

6. The method of claim 1, wherein executing the instruction code causes transmitting a command to an application server.

7. The method of claim 1, wherein the canonical utterance is an intermediate expression of automatically translating the received natural language utterance into the instruction code.

8. The method of claim 1, the method further comprising:
   generating, based on a previously generated instruction by the pre-trained natural language model, an output utterance;
   generating, based at least on the output utterance, an input utterance, wherein a combination of the input utterance and the output utterance forms the pair of the query utterance and the answer utterance;
   generating a prompt based on the pair of the query utterance and the answer utterance and the received natural language utterance;
   receiving a series of predicted parts of words from the pre-trained natural language model, wherein the predicted parts of the words are associated with the prompt; and
   generating, based at least on the series of predicted parts of words, the canonical utterance.

9. The method of claim 1, the method further comprising:
   receiving, from the pre-trained natural language model, at least a part of a predicted utterance;
   iteratively matching a sequence of predicted parts of words based on one or more grammatical rules, wherein the one or more grammatical rules correspond to constraints and preferences for translating between the canonical utterance and the instruction code; and
   determining, based on the iteratively matched sequence of predicted parts of words, the canonical utterance.

10. A system for automatically generating a program based on a natural language utterance using a pre-trained natural language model, the system comprises:
    a processor; and
    a memory storing computer-executable instructions that when executed by the processor cause the system to:
      receive the natural language utterance;
      identify, based on relevance between the received natural language utterance and a pair of a query utterance and an answer utterance, the pair of the query utterance and the answer utterance, wherein the query utterance is distinct from the received natural language utterance;
      generate, based at least on a combination of the received natural language utterance and the identified pair of the query utterance and the answer utterance as input to the pre-trained natural language model, a canonical utterance using the pre-trained natural language model, wherein the pre-trained natural language model performs prediction of words based on the received natural language utterance, the identified pair of the query utterance and the answer utterance represents an example of a natural language utterance input and output to influence predicting the words by the pre-trained natural language model without further training the pre-trained natural language model, the output is in canonical form and is previously generated at least in part by the pre-trained natural language model in response to the query utterance, and the canonical utterance includes, at least in part, a sequence of words based at least on the words predicted by the pre-trained natural language model and a constraint associated with the sequence of words;
generate, based on the generated canonical utterance, an instruction code, wherein the instruction code is executable by a processor;
execute, by the processor, the instruction code;
generate, based on a result of executing the instruction code, a response; and
transmit the response.

11. The system of claim 10, wherein the pre-trained natural language model includes an auto-regressive natural language model based on a transformer for paraphrasing a first sequence of tokens to generate a second sequence of tokens, and wherein the first sequence of tokens and the second sequence of tokens are distinct.

12. The system of claim 10, the computer-executable instruction when executed further causing the system to:
selecting the pair of the query utterance and the answer utterance, wherein the pair of the query utterance and the answer utterance includes an input utterance and an output utterance, and wherein the output utterance is based at least on one of previously generated instructions;
dynamically generate, based on the received natural language utterance, a prompt, wherein the prompt includes the pair of the query utterance and the answer utterance followed by the received natural language utterance;
transmit the prompt;
receive at least a plurality of a predicted part of a word as output from the pre-trained natural language model; and
generate, based on a series of the predicted part of a word, the canonical utterance.

13. The system of claim 10, the computer-executable instruction when executed further causing the system to:
generate, based on a previously generated instruction, an output utterance;
generate, based at least on the output utterance, an input utterance, wherein a combination of the input utterance and the output utterance forms the pair of the query utterance and the answer utterance;
generate a prompt based on the pair of the query utterance and the answer utterance and the received natural language utterance;
receive a predicted utterance from the pre-trained natural language model, wherein the predicted utterance is associated with the prompt; and
generate, based a series of predicted words from the pre-trained natural language model, the canonical utterance.

14. The system of claim 10, the computer-executable instruction when executed further causing the system to:
receive, from the pre-trained natural language model, at least a part of a predicted utterance;
iteratively match a sequence of predicted parts of words based on one or more grammatical rules, wherein the one or more grammatical rules correspond to constraints and preferences for translating between the canonical utterance and the instruction code; and
determine, based on the iteratively matched sequence of predicted parts of words, the canonical utterance.

15. A computer-readable recording medium storing computer-executable instructions for automatically generating a program based on a natural language utterance using a pre-trained natural language model, which, when executed by a processor, cause a computer system to:
receive the natural language utterance;
identifying, based on relevance between the received natural language utterance and a pair of a query utterance and an answer utterance, the pair of the query utterance and the answer utterance, wherein the query utterance is distinct from the received natural language utterance;
generate, based at least on a combination of the received natural language utterance and the pair of the query utterance and the answer utterance as input to the pre-trained natural language model, a canonical utterance using the pre-trained natural language model, wherein the pre-trained natural language model performs prediction of words based on the received natural language utterance, the identified pair of the query utterance and the answer utterance represents an example of a natural language utterance input and output to influence predicting the words by the pre-trained natural language model without further training the pre-trained natural language model, the output is in canonical form and is previously generated at least in part by the pre-trained natural language model in response to the query utterance, and the canonical utterance includes, at least in part, a sequence of words based at least on the words predicted by the pre-trained natural language model and a constraint associated with the sequence of words;
generate, based on the generated canonical utterance, an instruction code, wherein the instruction code is executable by a processor;
execute, by the processor, the instruction code;
generate, based on a result of executing the instruction code, a response; and
transmit the response.

16. The computer-readable recording medium of claim 15, wherein the pre-trained natural language model includes an auto-regressive natural language model based on a transformer for paraphrasing a first sequence of tokens to generate a second sequence of tokens, and wherein the first sequence of tokens and the second sequence of tokens are distinct.

17. The computer-readable recording medium of claim 15, wherein the canonical utterance is based on one or more of:
a set of grammatical rules associated with constraints and preferences for translating between the canonical utterance and the instruction code.

18. The computer-readable recording medium of claim 15, the computer-executable instruction when executed further causing the computer system to:
select the pair of the query utterance and the answer utterance, wherein the pair of utterances includes an input utterance and an output utterance, and wherein the output utterance is based at least on one of previously generated instructions;

dynamically generate, based on the received natural language utterance, a prompt, wherein the prompt includes the pair of the query utterance and the answer utterance followed by the received natural language utterance;

transmit the prompt;

receive at least a plurality of a predicted part of a word as output from the pre-trained natural language model; and generate, based on a series of the plurality of a predicted part of words from the pre-trained natural language model, the canonical utterance.

19. The computer-readable recording medium of claim 15, the computer-executable instruction when executed further causing the computer system to:

generate, based on a previously generated instruction, an output utterance;

generate, based at least on the output utterance, an input utterance, wherein a combination of the input utterance and the output utterance forms the pair of the query utterance and the answer utterance;

generate a prompt based on the pair of the query utterance and the answer utterance and the received natural language utterance;

receive a series of predicted parts of words from the pre-trained natural language model, wherein the predicted parts of the words are associated with the prompt; and generate, based at least on the series of predicted parts of words, the canonical utterance.

20. The computer-readable recording medium of claim 15, the computer-executable instruction executed further causing the computer system to:

receive, from the pre-trained natural language model, at least a part of a predicted utterance;

iteratively match a sequence of predicted parts of words based on one or more grammatical rules, wherein the one or more grammatical rules correspond to constraints and preferences for translating between the canonical utterance and the instruction code; and determine, based on the iteratively matched sequence of predicted parts of words, the canonical utterance.

* * * * *